March 12, 1929.  A. F. RUBIO  1,705,142
DIRECTION SIGNAL
Filed Feb. 7, 1928
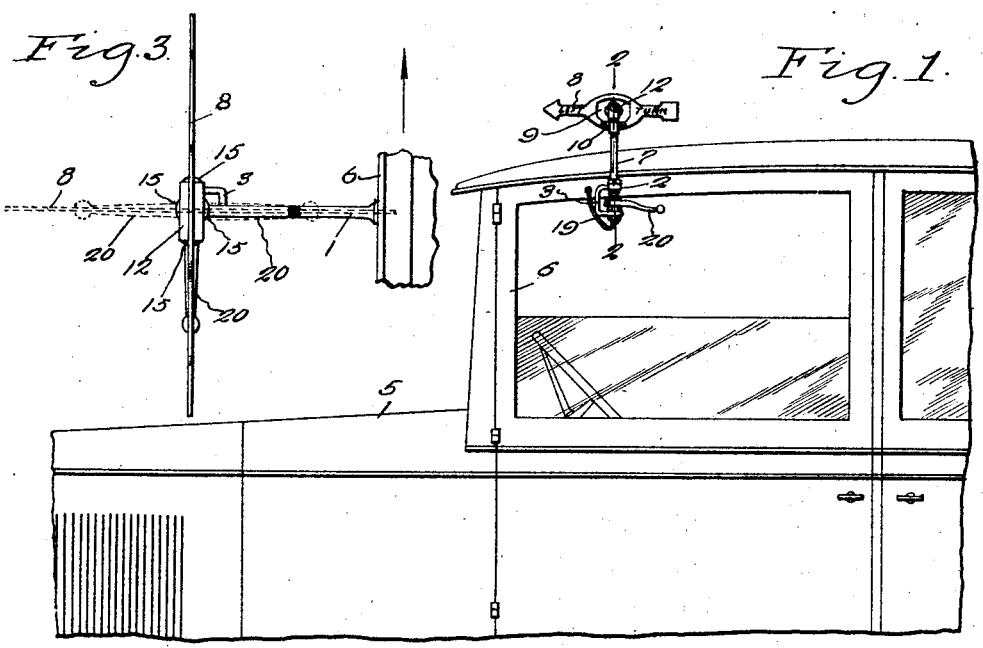
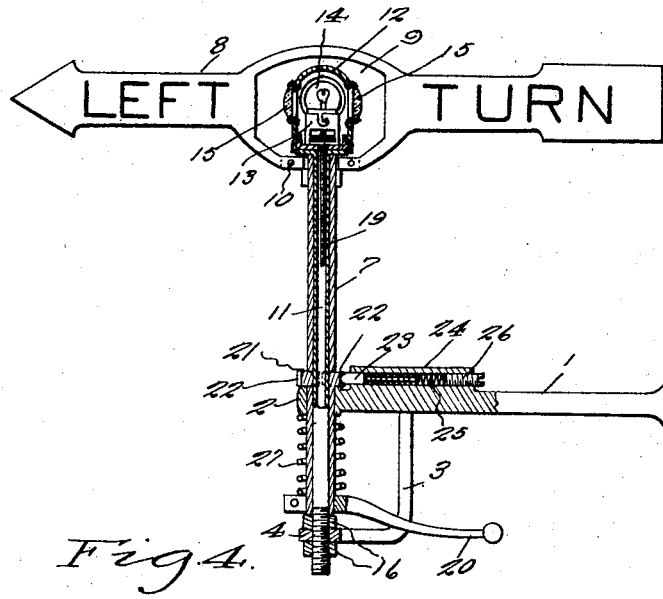
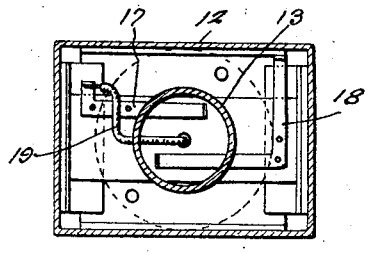
Andrew F. Rubio, Inventor Patented Mar. 12, 1929.

1,705,142

UNITED STATES PATENT OFFICE.

ANDREW F. RUBIO, OF SAN DIEGO, CALIFORNIA.

DIRECTION SIGNAL.

Application filed February 7, 1928. Serial No. 252,463.

This invention relates to direction signals for automobiles and like vehicles, and particularly to a manually adjustable signal adapted to be mounted upon a door or other part of a car so as to be conveniently operated by the driver to give a right or left turn, stop or other indication.

The object of the invention is to provide a device of this character adapted for both day and night signaling, which may be readily mounted upon a door or other part of a closed car, which is simple of construction and reliable and efficient in action and adapted to be manufactured and sold at a low cost, and which, if desired, may also be used as a parking light.

The invention consists of the features of construction, combination and arrangement of parts, hereinafter fully described and claimed, reference being had to the accompanying drawing, in which:—

Figure 1 is a side view of a portion of a closed car and showing the application of the invention, the indicator member being in normal position.

Figure 2 is a vertical section, on line 2—2 of Figure 1, on an enlarged scale and showing the indicating member turned to an indicating position.

Figure 3 is a top plan view showing in full and dotted lines the signal member in normal and one of its indicating positions.

Figure 4 is a horizontal section through the lamp socket and lamp casing.

In carrying my invention into practice I provide a signal device comprising a supporting bracket 1 provided at its outer end with a bearing eye or opening 2 and having depending therefrom an L-shaped supporting and bracing arm 3 having an eye or opening 4 arranged in vertical alinement with the eye or opening 2. The bracket 1 may be adapted for mounting the signal device upon some suitable part of the automobile or like vehicle 5. In the present instance the bracket 1 is shown as provided with a bolt end 5' adapted to engage the lintel of a door 6 at the side of the vehicle on which the steering wheel is located, so that the signal may be reached for convenient operation by the driver from his seat.

Journaled in and extending through and above and below the eye 2 is a hollow shaft 7 carrying at its upper end an arrow-shaped signal member 8. This member 8 is formed with a central opening 9 and provided at the base thereof with suitable fastening means 10 for securing said member to the upper end of the shaft 7. This member may be provided on one or both sides with suitable signal indicia and is designed when in normal or nonindicating position to extend parallel with the vehicle. Preferably the member 8 is also disposed so that it projects above the line of the roof of the vehicle so that it will have ample space for movement and so that, if desired, both faces thereof may be used for giving the same or different signal indications, which may be printed, imbossed or otherwise placed thereon.

The shaft 7 receives a tubular staff 11, on which it turns as a center of motion, and this staff extends at its upper end into the opening 9 of the indicating member 8 and is provided with a lamp casing 12 containing a socket 13 for the reception of an incandescent lamp 14. The lamp casing is of rectangular or oblong rectangular form and is provided in each of its sides with a lens or bull's eye 15 through which the light from the lamp may shine. These lenses or bull's eyes may be suitably colored. For example, the side lenses may be colored green or white, and the front and rear ones red, the red lenses adapting the device, if desired, to be employed as a parking light. If considered advisable, however, only the rear lens may be of red color for distance danger warning and the front lens may be of green color to indicate direction travel of the vehicle, in which event the side lenses may be of plain white glass.

The lamp casing may comprise a base fixed to the staff 11 and a body detachably mounted on the base, permitting of its ready access and removal and application through the opening 9, in order that burnt out lamps may be replaced and repairs made whenever necessary.

The staff extends at its lower end below the lower end of the shaft 7 and either extends loosely through or is in threaded engagement with the eye 4. In either event the lower end of the shaft is threaded to receive nuts 16 arranged above and below the eye 4 and in clamping engagement therewith to fasten the staff rigidly to the supporting and bracing arm 3. The upper nut 16 serves as a base support on which the lower end of the shaft 7 may turn and to hold it from downward movement. The lamp casing contains suitable conductors 17 and 18 for engagement with the terminals of the lamp. With the conductor 17 is connected a current supply wire 19 which extends downwardly into and through the staff 11 and leads in practice to any suitable part of the lighting circuit of the car. The other conductor 18 is or may be electrically connected with the ground side of the lighting circuit through the lamp casing and parts of the indicator and the body of the car. It will thus be seen that the staff 11 forms a stable stationary support for the shaft 7 and the indicator 8, and provides a means whereby the supply conductor 19 may be conveniently extended to the lamp and housed and protected to a very large extent from injury.

Connected with the lower end of the shaft 7 is an operating arm or lever 20 so arranged that it may be gripped and conveniently operated by the driver to turn the shaft 7 and swing the indicator 8 to indicating position. Provided upon the shaft 7 is a fixed collar 21 forming a locking member having a plurality of locking recesses 22 in its periphery. These locking recesses are adapted to be engaged by a sliding locking plunger or detent 23 mounted in a casing 24 on the upper side of the bracket 1 and adapted to be normally projected by a coiled spring 25, the working pressure of which may be varied and regulated by a screw plug abutment 26. Preferably three of the recesses 22 are provided, so positioned for engagement by the detent 23 as to permit the indicator to be locked in a normal position parallel with the vehicle or swung laterally in opposite directions at right angles to the vehicle and locked in either of these positions. As stated, both sides of the indicator 8 may be provided with a signal indication, such, for example, "Left-turn" on its left hand side, and "Right-turn" on its right hand side, so that when the indicator is swung laterally to the left it will give warning that the driver is about to make a left hand turn, while if the indicator is swung to the right will give warning that the driver is about to make a right hand turn. If desired, however, the right hand indication may be omitted and in lieu thereof a stop indication may be provided in its place, so that the device will serve to give warning of an intended left hand turn or an indication to stop at the option of the driver.

The locking action of the detent 23 may be sufficient ordinarily to hold the indicator in any of its adjusted positions, but, in order to ensure safety against the indicator being jolted or vibrated out of a locking position, as well as to give the structure greater stability, I provide a friction imposing spring 27 to hold the shaft 7 against any possibility of upward movement and to secure a determined degree of resistance to rotary movement of said shaft. This spring 27 is of coiled expansion type and surrounds the lower end of the shaft 7 between the eye 2 and the end of the handle 20 attached to the shaft. The pressure of the spring on the handle 20 causes the lower end of the shaft 7 to be held in frictional engagement with the upper nut 16, requiring a certain amount of working pressure to be exerted on the handle 20 in order to turn the shaft 7. By this means any possibility of the locking mechanism being released by jolts or vibrations will be prevented and accidental shifting of the indicator out of set position also prevented.

From the foregoing description, taken in connection with the drawing, the construction and operation of my improved direction signal will be readily understood, and it will be seen that the invention provides a device of this character which is simple of construction, reliable and efficient in operation, and capable of being manufactured and sold at a comparatively low cost. Also it will be seen that the indicator is adapted to be mounted on the vehicle in a simple manner and in position to be conveniently operated by the driver from his seat. Furthermore, it will be seen that the device is adapted for use as either a day or a night indicator, the lamp giving sufficient light to illuminate the indicator member 8 so that it can be plainly seen at night. The device is also adapted to be so arranged on the vehicle that it may be employed as a parking light if desired.

Having thus fully described my invention, I claim:—

A direction indicator comprising a supporting bracket, a hollow staff fixedly mounted on the bracket, a shaft mounted on the bracket to rotate about said staff and terminating at its upper end below the upper end of the staff, an indicating arm carried by the shaft and having a central opening extending transversely therethrough and into which the upwardly projecting end of the staff extends, a lamp casing carried by said upwardly projecting end of the staff and disposed within said opening, current supplying means extending through the staff to said casing, and means for rotating the shaft and holding the same locked in predetermined positions.

In testimony whereof I affix my signature.

ANDREW F. RUBIO.